United States Patent [19]

Plueddemann

[11] Patent Number: 5,001,011

[45] Date of Patent: Mar. 19, 1991

[54] IONOMERIC SILANE COUPLING AGENTS

[75] Inventor: Edwin P. Plueddemann, Midland, Mich.

[73] Assignee: Dow Corning Corporation, Midland, Mich.

[21] Appl. No.: 356,085

[22] Filed: May 24, 1989

Related U.S. Application Data

[62] Division of Ser. No. 202,163, Jun. 3, 1988, Pat. No. 4,863,978.

[51] Int. Cl.$^5$ .................. B32B 9/04; C09J 201/10
[52] U.S. Cl. ..................... 428/447; 428/448; 428/429; 156/326; 156/327; 156/329; 427/387; 427/407.2; 427/407.3; 523/213; 523/216; 525/100; 525/102; 525/431; 525/446
[58] Field of Search ............ 156/327, 329, 326; 523/231, 216; 525/100, 102, 431, 446; 528/26, 25; 427/387, 407.3, 407.2; 428/447, 448, 429

[56] References Cited

U.S. PATENT DOCUMENTS

| | | | |
|---|---|---|---|
| 3,179,612 | 4/1965 | Plueddemann | 525/40 |
| 3,258,477 | 6/1966 | Plueddemann et al. | 556/416 |
| 3,306,800 | 2/1967 | Plueddemann et al. | 525/100 |
| 3,630,827 | 12/1971 | Hartleir | 428/392 |
| 3,734,763 | 6/1973 | Plueddemann | 428/441 |
| 3,819,675 | 6/1974 | Plueddemann | 528/23 |
| 3,884,886 | 5/1975 | Plueddemann | 528/38 |
| 3,955,036 | 5/1976 | Plueddemann | 525/102 |
| 3,956,353 | 5/1976 | Plueddemann | 428/428 |
| 3,981,851 | 9/1976 | Plueddemann | 525/102 |
| 4,231,910 | 11/1980 | Plueddemann | 156/329 |
| 4,413,085 | 11/1983 | Temple | 524/321 |
| 4,690,959 | 9/1987 | Plueddemann | 523/213 |
| 4,718,944 | 1/1988 | Plueddemann | 106/287.11 |

*Primary Examiner*—John C. Bleutge
*Assistant Examiner*—R. Dean, Jr.
*Attorney, Agent, or Firm*—Alexander Weitz

[57] ABSTRACT

A novel ionomeric silane coupling agent is disclosed and its use in bonding a matrix polymer to a mineral substrate is described. The coupling agent is prepared by partially neutralizing the combined acid functionality present in a mixture of an acid-functional silane (or metal salt thereof) and an acid-functional film former with a metal ion. The coupling agent greatly improves bond strength in moist environments and is particularly suitable for use in formulating filled injection molding compositions.

14 Claims, No Drawings

IONOMERIC SILANE COUPLING AGENTS

This is a divisional of co-pending application Ser. No. 07/202,163 filed on 6-03-88 U.S. Pat. No. 4,863,978.

This invention relates to the field of silane coupling agents. More specifically, this invention relates to an ionomeric silane coupling agent prepared by partially neutralizing the combined acid functionality present in a mixture of an acid-functional silane and an acid-functional film former with a metal ion. It further relates to a process of using the ionomeric silane as a coupling agent to promote bonding between a thermoplastic matrix polymer and a mineral or metal substrate.

BACKGROUND OF THE INVENTION

Silane coupling agents have been known to improve the mechanical properties of filled thermoseting and thermoplastic resins since the late 1940's. These low molecular weight compounds are believed to form chemical links between filler particles and polymer molecules and as such, they must incorporate functional groups capable of reacting, or at least associating, with filler and resin alike. Although use of various silanes known in the art does greatly promote adhesion between thermoplastic polymers and substrates such as mineral fillers, exposure of these composites to water severely limits retention of the improved adhesion. Thus, for example, a moist environment can induce a gradual deterioration of the flexural strength of composites filled with silane-treated reinforcing fibers, and there is still need for improvement. Furthermore, when such fiber filled polymers are subjected to high shear rates, as in an injection molding operation, there is a tendency to destroy some of the covalent bonding (or any associative structure) formed between the coupling agent and the polymer. This also detracts from ultimate physical properties of the composite. There is thus a need for a coupling agent which forms strong bonds or associations between itself and the polymer under ordinary conditions, which bonds become highly mobile at the elevated temperatures and shear rates encountered during injection molding. Even more desirable would be the availability of such a silane coupling agent which additionally imparted bond durability when challenged by conditions of high moisture.

SUMMARY OF THE INVENTION

It has now been found that above mentioned desirable features can be achieved by treating a mineral substrate with an ionomeric silane composition comprising a mixture of an acid-functional silane and an acid-functional film former in which at least some of the combined acid functionality has been neutralized by the metal cation of an ionic compound. One aspect of this concept is disclosed in a copending application Ser. No. 202,164, , filed on June 3, 1988, now U.S. Pat. No. 4,871,788 hereby incorporated by reference.

Although not wishing to be bound by any particular theory or explanation, it is believed that one end of the acid-functional silane forms covalent bonds on the surface of the mineral substrate, as in the case of current art coupling agents. However, contrary to known systems, the other end of the silane is reversibly bound to the acid-functional film former through ionic interactions It is thus hypothesized that the microscopic interphase region between the substrate and the polymer remains tough and immobile at ordinary temperatures, but is relatively fluid at the elevated temperatures and high shear rates experienced during injection molding.

The present invention therefore relates to a composition comprising:
- (I) an acid-functional silane;
- (II) an acid-functional film former selected from the group consisting of carboxylated thermoplastic polymers and carboxylated thermoplastic copolymers; and
- (III) a sufficient amount of an ionic compound, having a cation selected from the group consisting of monovalent and divalent metal ions, to partially neutralize the total acid functionality present in said acid-functional silane (I) and said acid-functional film former (II).

This invention also relates to a composition comprising the above mentioned acid-functional film former (II) and (IV) a sufficient amount of a metal salt of said acid-functional silane (I), having a cation selected from the group consisting of monovalent and divalent metal ions, to partially neutralize the acid functionality present in said acid-functional film former (II).

The present invention further relates to a process for bonding a thermoplastic matrix polymer or acid-modified thermoplastic matrix polymer to a substrate comprising:
- (a) treating said substrate with one of the above described compositions; and
- (b) fusing said matrix polymer to the treated substrate resulting from step (a).

DETAILED DESCRIPTION OF THE INVENTION

In a first aspect of the present invention, an ionomeric silane coupling agent composition is prepared by mixing (I) an acid-functional silane, (II) an acid-functional film former and (III) an ionic compound having a metal cation.

The acid-functional silane (I) consists of an acid group covalently bonded to a trialkoxysilane, trihydroxysilane or silsesquioxane structure by an organic connecting group. The exact nature of the connecting group is inconsequential as long as it is inert with respect to the other components of the coupling agent composition. Thus, the acid-functional silane has one of the following structures in its molecule, oligomeric siloxane condensation products thereof also being within the scope of the present invention:

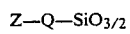

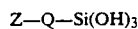

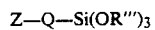

in which Z denotes an acidic group and Q is a divalent organic connecting group. In the last formula, R''' is selected from methyl, ethyl or propyl radicals. The acidic group Z can be any functional group derived from a protonated oxy acid of carbon, phosphorous, sulfur, selenium or arsenic. Examples of such acidic groups include sulfonic, selenic, arsenic, phosphoric, phosphonic and carboxylic acid functionalities. It is preferred that Z is carboxylic acid (—COOH) functionality The connecting group Q is preferably a short chain hydrocarbon, such as dimethylene or trimethylene, or an aromatic group, such as phenylene or ethylphenylene.

Specific examples of the acid-functional silane (I) include the following structures:

$_{3/2}OSi-CH_2CH_2CH_2-COOH$

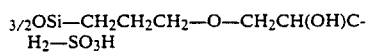

$_{3/2}OSi-CH_2CH_2CH_2-O-CH_2CH(OH)CH_2-SO_3H$

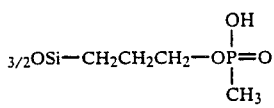

$_{3/2}OSi-CH_2CH_2CH_2-OP(OH)(=O)CH_3$

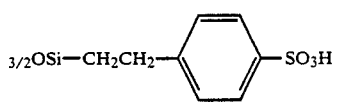

$_{3/2}OSi-CH_2CH_2-C_6H_4-SO_3H$

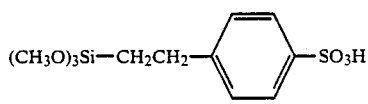

$(CH_3O)_3Si-CH_2CH_2-C_6H_4-SO_3H$

$_{3/2}OSi-C_6H_4-SO_3H$

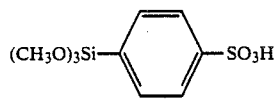

$(CH_3O)_3Si-C_6H_4-SO_3H$

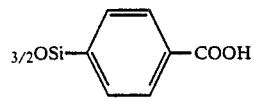

$_{3/2}OSi-C_6H_4-COOH$

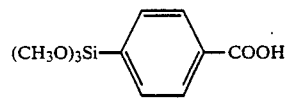

$(CH_3O)_3Si-C_6H_4-COOH$

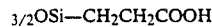

$_{3/2}OSi-CH_2CH_2COOH$

$(CH_3O)_3Si-CH_2CH_2COOH$

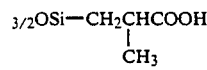

$_{3/2}OSi-CH_2CHCOOH$
     |
     $CH_3$

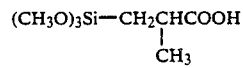

$(CH_3O)_3Si-CH_2CHCOOH$
       |
       $CH_3$

The acid-functional film former (II) is selected from carboxylated thermoplastic polymers or carboxylated thermoplastic copolymers. These materials, many of which are available commercially, are well known in the art. They are typically formed by copolymerizing a minor portion (usually no more than about 10 mole percent) of a carboxy-functional monomer with one or more reactive monomers so as to leave pendant or terminal —COOH groups on the resulting polymer or copolymer. They may also be formed by grafting carboxylic acid functionality onto a polymer chain. In general, such carboxylated systems are the result of addition-type polymerizations typically free radical polymerizations, but may also be based on carboxylated condensation polymers such as polyurethanes, polyesters and alkyd resins. Component (II) is preferably selected from carboxylated polymers of polyethylene, poly(methylmethacrylate), copolymers of ethylene with acrylic or methacrylic acid and styrene-butadiene copolymers.

The acid-functional film former (II) may be incorporated into the compositions of the present invention in aqueous or solvent dispersion form. Preferably, it is added as a water emulsion.

The ionic compound (III) is selected from salts, hydroxides or oxides of monovalent or divalent metals. When a metal salt is used, it is preferred that it be a water-soluble organic salt, such as an acetate or formate. Halide salts are considered unsuitable herein, however. Examples of suitable ionic compounds include those having sodium, lithium, zinc, calcium, magnesium or potassium cations. Preferred ionic compounds are sodium hydroxide and zinc acetate.

In order to form the compositions according to the first aspect of the present invention a mixture of components (I), (II) and (III) is prepared. The molar ratio of component (II) to component (I) in this mixture is between about 0.01 and 100 based on the acidic groups on each. Preferably approximately equal molar quantities are used. The amount of component (III) employed is such that the total acid functionality of components (I) and (II) is at least partially neutralized by the metal ion present in component (III). Those skilled in the art will readily determine the optimum degree of neutralization required for a particular system through routine experimentation. Preferably, from about 20% to 80% the acid functionality is neutralized by the metal (on a molar equivalent basis). Most preferably, from about 30% to 60% of the acid functionality is so neutralized.

In a second aspect of the present invention, a ionomeric silane coupling agent is prepared by mixing a metal salt of the acid-functional silane (I) with the acid-functional film former (II) and, optionally, the ionic compound (III). The skilled artisan will of course recognize that in such a salt, the metal ion can associate with the oxygens on silicon in addition to associating with the acidic functionality in (I) and its structure is generally not readily determinable. Thus, for example, the structure would best be represented by a formula such as

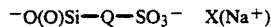

$-O(O)Si-Q-SO_3^-$  $X(Na^+)$ for the case of a sodium salt of a sulfonic acid-functional silane, wherein x is sufficient to impart neutrality to the salt.

The acid-functional silanes and their metal salts, described above, are well known in the art. Examples of such compounds, along with methods for their preparation, may be found in U.S. Pat. No. 4,344 860 U.S. Pat. No. 4,370,255, U.S. Pat. No. 4,503,242 and U.S. Pat. No. 3,956,353.

In a second aspect of the compositions of the present invention, the same metal cations disclosed above in the description of component (III) are employed as the counter ion in (IV), a salt of the acid-functional silane (I). The metal cation of such a salt thus serves to neutralized some of the acidity associated with component (II) and serves to reduce the amount of component (III) needed. It is also within the scope of the present invention to completely eliminate component (III) when the amount of the metal salt of the acid-functional silane supplies sufficient metal ion to partially neutralize the acidity present in component (II). The preferred degree of neutralization is the same as discussed in connection with the first aspect of the present invention, above.

In order to form the compositions according to the second aspect of the present invention, a mixture of components (II), (IV) and optionally, (III) is prepared. Since the degree of neutralization of the acidity is determined through routine experimentation, as above the relative amounts of component (II) and component (IV) is likewise experimentally obtained, as is the amount of component (III), if any. As before, it is preferred that from about 20% to 80% the total acid functionality is neutralized by the metal ion (on a molar equivalent basis), 30% to 60% neutralization being most preferred.

The components of the present invention can be dispersed in solvents such as methanol, ethanol and propylene glycol monomethyl ether. It is preferred, however, that mixing be carried out in a water dispersion, from which the composition may be applied to a substrate, as described infra. The acidfunctional silanes are generally soluble in water but methods which may also be used to disperse silane coupling agents in water are described by Plueddemann in U.S. Pat. No. 3,258,477.

The present invention also relates to a process for bonding a thermoplastic matrix polymer to a substrate by (a) treating the substrate with a composition of the present invention and (b) fusing the thermoplastic matrix polymer to the treated substrate resulting from step (a).

In a first embodiment of the process of the present invention, the matrix polymer is selected from thermoplastic polymers or copolymers such as polyethylene, nylon, styrenebutadiene copolymers, polyolefin copolymers, polyesters and poly(vinyl chloride).

The choice of a given matrix polymer or copolymer dictates the type of acid-functional film former (II) to be used in the coupling agent composition inasmuch as these two materials must be compatible (i.e., they do not phase separate). Thus, for example, when the matrix polymer is polyethylene, the acid-functional film former is preferably a carboxylated polyethylene.

In the above process, a substrate is first treated with one of the previously described compositions of the present invention according to methods well established in the art. The silane coupling agents may be applied to substrates by dipping, spraying, dry blending methods, such as tumbling with a mineral filler in a container, or by mechanical mixing with a filler, followed by drying in air at 100° to 175° C. Preferably, the ionomeric silane coupling agent is deposited onto the surface of the substrate from a water dispersion and the treated substrate dried at temperatures between 100° and 175° C.

The treated substrate may then be bonded to the matrix polymer by fusing the latter onto the former at a temperature sufficient to impart fluidity to the polymer (e.g., above the melt point in the case of a crystalline polymer).

Substrates contemplated herein can be fillers which are typically used to extend or reinforce the above mentioned thermoplastic matrix polymers. They are inorganic materials which may be of natural or synthetic origin, but have a common feature in that their surfaces contain hydroxyl functionality to a greater or lesser extent. Notable within this general category of fillers are the siliceous materials such as glass fiber, precipitated silica, ground quartz, aluminum silicate, zirconium silicate, calcium silicate, glass micro beads, mica, asbestos, clay, vitreous enamels and ceramics. Other examples of suitable fillers include alumina, silicon carbide, silicon whiskers, metals and metal oxides.

In addition to the filler, other components, such as catalysts, pigments, stabilizers and antioxidants may be included in a typical filled polymer formulation. These formulations may be molded into desired shapes by, e.g., compression or injection molding. As noted above, the coupling agents of the present invention are of particular advantage in treating reinforcing fillers, such as glass fibers, for use in compositions for injection molding.

The substrate may also consist of a bulk material, wherein the coupling agents of the present invention are used to prime the surfaces thereof. Examples of such substrates include metals, metal oxides, glass, mica composites, asbestos composites, fired clay, vitreous enamel, silicon carbide, alumina and ceramics, inter alia. Methods for using silane coupling agents as primers are well known in the art. Typically, the surface of a substrate is wetted by the coupling agent by dipping, brushing, spraying, or wiping, for example. As before the silane may be applied from solution or dispersion, the preferred method being application from aqueous solution or dispersion at about a 5-20% (by weight) concentration. After application, the primed surface is usually dried to remove any solvent or water employed. The primed surface of this invention forms water-resistant bonds to the matrix polymer when it is fused thereon.

In a second embodiment of the process of the present invention, the matrix polymer is selected from thermoplastic acid-modified polymers or copolymers. These materials are also well known in the art and are substantially identical to the matrix polymers described above wherein a minor portion of acid functionality has been copolymerized into the main polymer chain or grafted thereto. Thus, the carboxylated polymers used as component (II), supra, form one class of such acid-modified systems. In this case, however, they may also take the form of bulk polymers.

Additionally, the acid-modified polymer may be an ionomer. In this case, the ionic content of the polymer should be taken into account in determining the proper degree of neutralization of the acid functionality of components (I) and (II) of the compositions of the present invention.

In the second embodiment of the process of the present invention, it is further contemplated that a minor portion (e.g., from about 1 to 10 weight percent) of an acid-modified polymer may be blended with a compatible unmodified matrix polymer.

It has also been found that, when the matrix polymer is selected from acid-modified polymers or the above mentioned blend of acid-modified polymer and unmodified polymer, the need for the acid-functional film former of the present invention is reduced or completely eliminated. Thus, this invention also relates to a process for bonding such an acid-modified polymer or blend to a substrate by (a) treating the substrate with either a combination of components (I) and (III) or with component (IV) and, as before, (b) fusing the thermoplastic matrix polymer to the treated substrate resulting from step (a). In either case, the principle of partial neutralization, outlined above, again applies.

EXAMPLES

The following examples are offered for the purpose of illustration and should not be construed as limiting the claimed invention.

Metal salts of acid-functional silanes used in the examples included the structures:

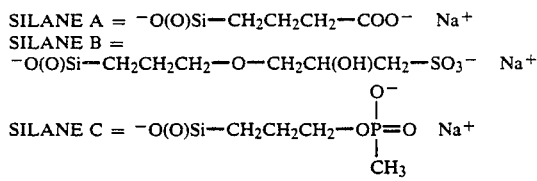

Other ingredients used herein were:
PLEXAR-6 is a carboxylated polyethylene (Chemplex Co., Rolling Meadows, Ill.).
PRIMACOR 4983 is an aqueous emulsion of a polyethylene-acrylic acid copolymer (Dow Chemical Co., Midland, Mich.).

EXAMPLES 1-3

A primer solution of SILANE C (i.e. component IV of the present invention) was prepared by diluting one mole of this compound with water to form 1000 grams of solution. The primer solution was applied to a precleaned glass microscope slide by wiping with a paper tissue and allowing the coating to dry at 100° C. for 15 minutes. A five mil thick film of PLEXAR-6 was then fused onto the primed slide by pressing the composite at about 200° C. for one minute. A control, using an unprimed slide, was similarly processed. Initial adhesion of the acid-modified polymer to the glass surface was determined by prying or scraping the films from the glass slides using a razor blade.

The slides were then submerged in water at room temperature and the adhesion of the polymer to the primed glass was monitored. Results are presented in Table 1, wherein the following rating scheme pertains:

| Rating | Observation |
| --- | --- |
| nil | Fell off (Dry) or Floated free of glass slide (Wet) (adhesive failure). |
| fair | Could be removed in one piece with razor blade (adhesive failure). |
| good | Could be pried off in pieces (adhesive and cohesive failure). |
| excellent | Could not be removed from glass (cohesive failure). |

Time to failure, reported in Table 1, is defined as the point at which the adhesion rating dropped below "good" or fell off completely. As can be seen from Table 1, the primed system took considerably longer to fail than the control, (Comparison Example 1.

TABLE 1

| | Silane Primer | Initial Adhesion Rating | Time to Failure |
| --- | --- | --- | --- |
| (Comparative) | | | |
| Example 1 | None | fair | 1 hour (nil rating) |
| Example 2 | SILANE C | excellent | 2 days (fair rating) |

EXAMPLE 3-7

Water solutions of SILANE A, SILANE B and SILANE C (one mole per 1000 grams of solution) were mixed with equal weights of PRIMACOR 4983 emulsion (i.e., the film former of the present invention) which had been diluted with water so as to contain 1.2 moles of carboxylic acid groups per 1000 grams of solution. It was calculated that these mixtures had a degree of neutralization of 40% based on the carboxylic acid functionality introduced by the film former. These mixtures were used to prime glass slides, as described above, and the coatings dried at 100° C. for 15 minutes. High density polyethylene was pressed onto each slide at a temperature of 250° C. and the composites were tested as before. Initial adhesion and time to failure are reported in Table 2. (Comparative) Example 3 shows results for an unprimed slide and (Comparative) Example 4 shows results for a slide primed only with the PRIMACOR 4983 film former.

TABLE 2

| | Primer | Initial Adhesion Rating | Time to Failure |
| --- | --- | --- | --- |
| Comparative) Example 3 | None | poor | 1 hour (nil rating) |
| Comparative) Example 4 | PRIMACOR 4983 | excellent | 2 hours (nil rating) |
| Example 5 | SILANE A/ PRIMACOR | excellent | 4 days (fair rating) |
| Example 6 | SILANE B/ PRIMACOR | excellent | 1 day (fair rating) |
| Example 7 | SILANE C/ PRIMACOR | excellent | 2 days |

It can be seen from table 2 that the compositions of the present invention retain their excellent adhesion much longer than the controls when exposed to a water environment.

I claim:

1. A process for bonding a thermoplastic acid-modified matrix polymer to a substrate comprising:
   (a) treating said substrate with a composition comprising an acid-functional silane and an ionic compound having a cation selected from the group consisting of monovalent and divalent metal ions; and
   (b) fusing said thermoplastic acid-modified matrix polymer to the treated substrate resulting from step (a), said metal cation being present to an extent sufficient to partially neutralize the acid functionality supplied by said acid-functional silane and said thermoplastic acid-modified polymer matrix.

2. A process according to claim 1, wherein the acid functionality of said acid-functional silane is carboxylic.

3. A process according to claim 2, wherein said ionic compound is present to an extent sufficient to neutralize about 20 to 80 percent the total acid functionality of said acid-functional silane and said thermoplastic acid-modified polymer.

4. A process according to claim 3, wherein said metal cation is is selected from the group consisting of sodium and zinc ions.

5. A process for bonding a thermoplastic matrix polymer to a substrate comprising:
   (a) treating said substrate with a composition comprising (I) an acid-functional silane, (II) an acid-functional film former selected from the group consisting of carboxylated thermoplastic polymers and carboxylated thermoplastic copolymers and (III) an ionic compound having a cation selected from the group consisting of monovalent and divalent metal ions; and
   (b) fusing said thermoplastic matrix polymer to the treated substrate resulting from step (a), said metal cation being present to an extent sufficient to partially neutralize the acid functionality supplied by said acid-functional silane and said acid-functional film former.

6. A process according to claim 5, wherein the acid functionality of said acid-functional silane is carboxylic.

7. A process according to claim 6, wherein said ionic compound is present to an extent sufficient to neutralize about 20 to 80 percent the total acid functionality of components (I) and (II) on a molar equivalent basis.

8. A process according to claim 7, wherein said metal cation of said ionic compound is selected from the group consisting of sodium and zinc ions.

9. A process for bonding a thermoplastic matrix polymer to a substrate comprising:
   (a) treating said substrate with a composition comprising an acid-functional film former selected from the group consisting of carboxylated thermoplastic polymers and carboxylated thermoplastic copolymers and a sufficient amount of a metal salt of an acid-functional silane, having a cation selected from the group consisting of monovalent and divalent metal ions to partially neutralize the acid functionality present in said acid-functional film former; and
   (b) fusing said thermoplastic matrix polymer to the treated substrate resulting from step (a), said metal cation being present to an extent sufficient to partially neutralize the acid functionality supplied by said acid-functional film former.

10. A process according to claim 9, wherein said metal cation is present to an extent sufficient to neutralize about 20 to 80 percent the total acid functionality of said acidfunctional film former 11. A process according to claim 10, wherein said metal cation is selected from the group consisting of sodium and zinc ions.

12. An article of manufacture prepared according to the process of claim 1.

13. An article of manufacture prepared according to the process of claim 5.

14. An article of manufacture prepared according to the process of claim 9.

* * * * *